(No Model.)

A. A. BENNETT.
Hand Circular Saw.

No. 239,703.        Patented April 5, 1881.

WITNESSES:
W. W. Hollingsworth
John E. Kenson

INVENTOR:
A. A. Bennett
BY
ATTORNEYS.

UNITED STATES PATENT OFFICE.

ALBERT A. BENNETT, OF HARVEYSBURG, OHIO.

HAND CIRCULAR SAW.

SPECIFICATION forming part of Letters Patent No. 239,703, dated April 5, 1881.

Application filed August 28, 1880. (No model.)

*To all whom it may concern:*

Be it known that I, ALBERT A. BENNETT, of Harveysburg, in the county of Warren and State of Ohio, have invented a new and Improved Hand Circular Saw; and I do hereby declare that the following is a full, clear, and exact description of the same, reference being had to the accompanying drawings, forming part of this specification, in which—

Figure 1:
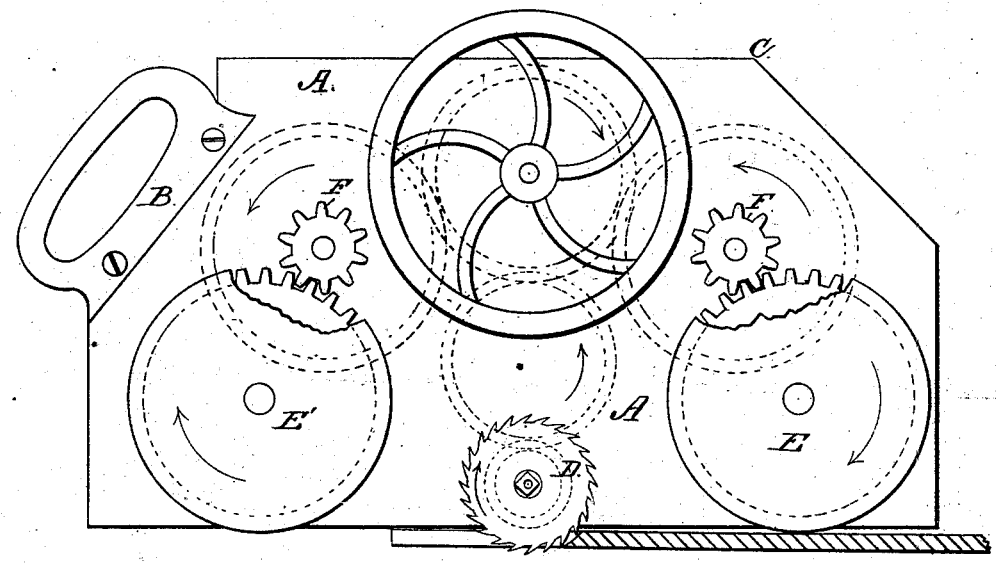
Figure 2:
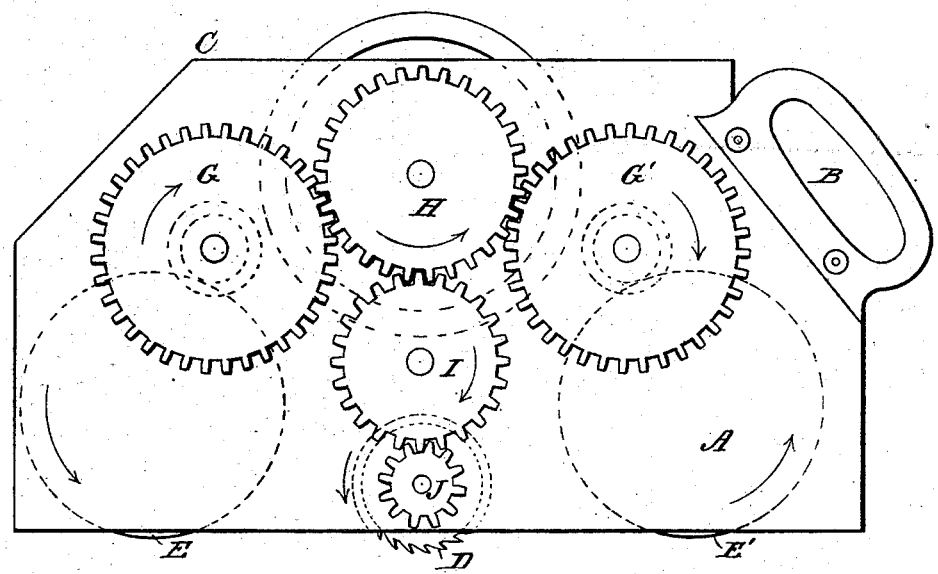

Figure 1 is a side view from the saw side. Fig. 2 is a side view from the opposite side.

The object of my invention is to provide a circular saw which shall be in the nature of a hand-tool for cutting thin lumber; and it consists in a plate having near its middle and at its lower edge a small circular saw loosely revolving in a bearing, and having in front and rear of the same, and slightly projecting below the lower edge of the blade, a gear-wheel which, as the plate is steadily pushed over the surface of the board, bites the latter, and through a train of gear-wheels imparts a rotary motion to the saw, which, as the plate advances, cuts a kerf through the board with a circular sweep, as hereinafter fully described.

In the drawings, A represents the saw-plate, having at one end a handle, B, and having preferably near the other end, at C, a suitable bearing (not shown) for the left hand, for the application of pressure.

D is a small circular saw, journaled near the middle of the saw-plate and at its lower edge, so as to project below the lower edge of the plate a sufficient distance to pass through any board that is required to be cut. In front and rear of this saw are disposed the combined friction and gear wheels E E', which are also journaled in bearings in the saw-plate, and which project just far enough below the lower edge of the saw-plate to bite or clutch the board when pushed over the same, so as to derive rotary motion from this advance. These wheels E E' engage with smaller gear-wheels F F' fixed on shafts that extend through the saw-plate, which shafts carry upon the opposite side of the saw-plate other gear-wheels, G G', Fig. 2, which engage with a central gear-wheel, H, and impart the same rotary motion thereto. This latter gear-wheel H meshes with another gear-wheel, I, and this, in turn, engages with a small gear-wheel, J, on the same shaft with the circular saw.

Now, the saw-plate being placed upon the edge of the board, with its front wheel, E, resting upon the surface of the board, and pressure being applied and the plate steadily advanced, it will be seen that the wheel E is made to rotate in the direction of the arrows to drive the circular saw, and as soon as the rear wheel, E', reaches the edge of the board it also bites the board and co-operates with the front wheel to impart the same movement to the saw.

In making use of this tool one bearing-wheel and train of wheels may be employed without departing from my invention; but for practical purposes I prefer two trains, as shown.

In defining my invention more clearly, I would state that I am aware that machines for cutting ice have been constructed with bearing-wheels journaled in a rectangular frame-work, which bearing-wheels are connected with a circular saw, so as to cause the rotation of the latter to cut the ice whenever said machine is drawn across the ice. This, however, is not in any sense a hand-tool, but a heavy draft machine, and my invention differs from the same constructively, in that my frame which carries the gear-wheels is in the nature of a single flat thin blade or plate, and to this my claim is limited. This flat thin blade not only serves as a frame for carrying the wheels and saw, but its straight edge also serves as a guide to the eye for preserving a straight line of cut—a very necessary function in a tool propelled by hand from the rear, and in which there is no automatic guiding, such as exists when the blade of a handsaw moves through the slit in the board.

Having thus described my invention, what I claim as new is—

1. A hand circular saw consisting of a plate having a circular saw projecting at its lower edge and one or more bearing-wheels, arranged also at its lower edge and connected with the circular saw by a train of wheels, so as to impart rotary motion thereto, substantially as described.

2. A hand circular saw consisting of the plate A, having a handle, in combination with the circular saw D, the bearing-wheels E E', and a train of wheels acting together, as described, to connect both of these bearing-wheels with the circular saw and impart motion thereto, as set forth.

The above specification of my invention signed by me this 13th day of August, 1880.

ALBERT A. BENNETT.

Witnesses:
SOLON C. KEMON,
CHAS. A. PETTIT.